United States Patent [19]
Pohlmann

[11] 4,312,476
[45] Jan. 26, 1982

[54] BIVALENT HEATING SYSTEM

[75] Inventor: Erich Pohlmann, Kulmbach, Fed. Rep. of Germany

[73] Assignee: ASK August Schneider GmbH & Co. KG, Kulmbach, Fed. Rep. of Germany

[21] Appl. No.: 973,530

[22] Filed: Dec. 26, 1978

[30] Foreign Application Priority Data

Dec. 29, 1977 [DE] Fed. Rep. of Germany ....... 2758773

[51] Int. Cl.³ ........................................... G05D 23/00
[52] U.S. Cl. ..................................... 237/2 B; 165/62; 165/64; 62/324.2; 62/238.3
[58] Field of Search ...................... 62/238 B, 483, 489, 62/324.1, 324.2, 238.3; 165/62, 197; 237/2B

[56] References Cited
U.S. PATENT DOCUMENTS 2,004,843  6/1935  Wilkes et al. .................. 62/238 B
2,272,871  2/1942  McGrath ........................ 62/238 B Primary Examiner—Albert J. Makay
Assistant Examiner—Henry Bennett
Attorney, Agent, or Firm—Herbert L. Lerner

[57] ABSTRACT

Bivalent heating system having a directly fired heat pump with an absorber and a burner-heated generator disposed in a refrigerant circulation loop, the refrigerant loop being coupled through heat exchanging means to a heating medium loop for space heating and including control means activatable when a predetermined ambient temperature is reached for increasing fuel supply to the burner of the heat pump and for switching circulation in the refrigerant loop from heat pump operation to pure heat exchanger operation.

2 Claims, 2 Drawing Figures

BIVALENT HEATING SYSTEM

The invention relates to a bivalent heating system with a directly fired absorption heat pump, the refrigerant loop of which is coupled through heat exchangers to a heating medium loop for space heating.

The known heating systems with a heat pump have an adequate performance figure which provides an economically justifiable efficiency in comparison to the cost down to an ambient temperature of −3° C. In known heating systems, conventional supplemental heating using oil or gas heat for instance, has been provided for alternative bivalent operation at an ambient temperature of −3° C. The system is supposed to be constructed so that the rated output thereof can cover the heat demand of an object to be heated in part if the heat pump operates at the same time, and so that it can cover it completely in alternative operation.

It is therefore an object of the invention to provide a bivalent heating system which overcomes the aforementioned disadvantages of the heretofore known conventional systems of this general type and which is capable of covering the heat demand of an object to be heated independently of the ambient temperature without corresponding overconstruction of the heat pump and without conventional supplemental heating.

With the foregoing and other objects in view, there is provided, in accordance with the invention a bivalent heating system having a directly fired heat pump with an absorber and a burnerheated generator disposed in a refrigerant circulation loop, the refrigerant loop being coupled through heat exchanging means to a heating medium loop for space heating, comprising control means activatable when a predetermined ambient temperature is reached for increasing fuel supply to the burner of the heat pump and for switching circulation in the refrigerant loop from heat pump operation to pure heat exchanger operation.

In accordance with another feature of the invention, there are provided valve means for interrupting circulation in the refrigerant loop and for shunting flow between the generator and the absorber bypassing other heat exchanging means.

In accordance with a further feature of the invention, there are provided first valve means for interrupting circulation in the refrigerant loop, an evaporator disposed in the refrigerant loop, a valve-controlled bypass line shunting the evaporator, second valve means for interrupting flow between the generator and the absorber, a condenser disposed in the refrigerant loop, a check valve disposed in the refrigerant loop between the generator and the condenser, a further bypass line connected from the generator to a location in the refrigerant loop between the check valve and the condenser, and third valve means for controlling flow through the further bypass line.

In accordance with a concomitant feature of the invention, all of the valve means are magnetic valves and the control means are temperature switch means for sensing the ambient temperature and turning the magnetic valves on and off.

The measures according to the invention make it possible to switch a heat pump of the type described at the outset, with little extra cost in control means and lines, from heat pump operation to pure heat exchanger operation according to conventional heating, if the ambient temperature drops below a predetermined value (−3° C.), so that the cost of conventional supplemental heating is eliminated.

Other features which are considered as characteristic for the invention are set forth in the appended claims.

Although the invention is illustrated and described herein as embodied in a bivalent heating system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
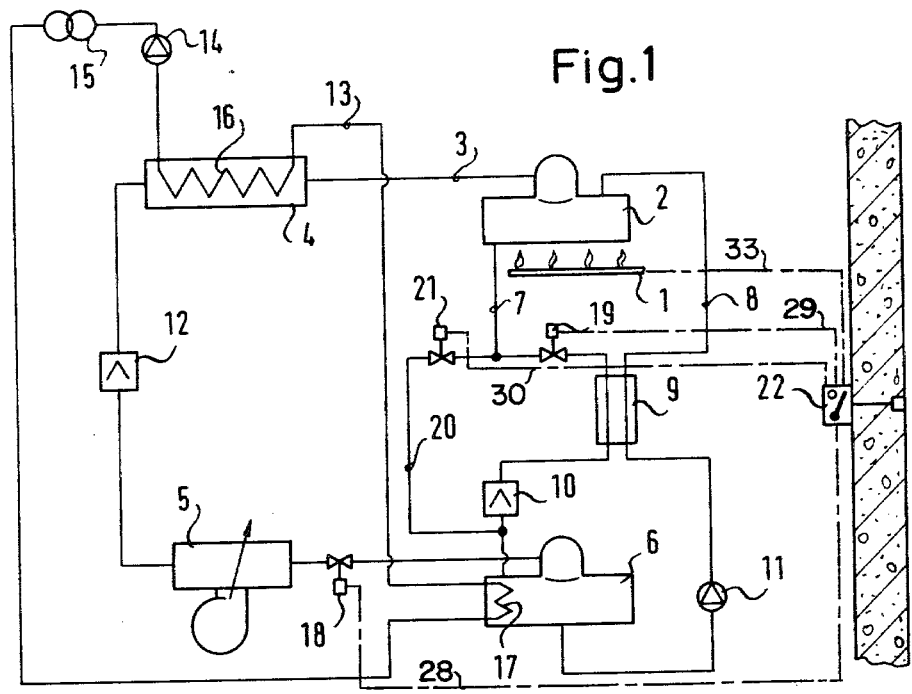
FIG. 1 is a schematic view of a first embodiment of the invention.

Referring now to the figures of the drawing and first, particularly, the heat pump shown diagrammatically in FIG. 1 includes a gas burner 1, a generator 2 which contains an ammonia-water refrigerant mixture, and a refrigerant loop 3 which contains a throttling valve 12, a condenser 4 and an evaporator 5 as well as an absorber 6. The absorber 6 is connected to the generator 2 through the outgoing line 7 for weak solution and through the return line 8 for strong solution. The outgoing and return lines 7, 8 conduct solution between the generator 2 and the absorber 6 through a heat exchanger 9. In addition, a throttling valve 10 is provided in the outgoing line 7 and a pump 11 is provided in the return line 8.

A heating medium loop 13, which includes a circulation pump 14 as well as several room radiators 15, is coupled to the condenser 4 through a heat exchanger 16 and to the absorber 6 through a further heat exchanger 17, which is constructed as a trickling or spray type exchanger.

A magnetic valve 18 is inserted into the refrigerant loop 3 between the evaporator 5 and the absorber 6. A further magnetic valve 19 is inserted into the outgoing line 7 between the generator 2 and the heat exchanger 9. In addition, there is provided a bypass line 20 which shunts the heat exchanger 9 and the throttling valve 10 and which contains another further magnetic valve 21. A temperature switch 22 which responds at a predetermined ambient temperature closes the magnetic valves 18 and 19 and opens the magnetic valve 21. The temperature switch 22 is connected to the valves 18, 19, 21 by electrical connections 28, 29, 30, respectively, shown diagrammatically by dot-dash lines. In addition, the output of the burner 1 is increased by the temperature switch 22 to a higher value, say four-times the previous value by way of the electrical connection 33. However, within the scope of the invention it is also possible to increase the fuel supply to the burner 1 gradually, as a function of the temperature.

Until the switching temperature is reached, the heat pump shown is operated in the conventional manner. After the switching temperature is reached, the switching operation results in an interruption of the flow through the refrigerant loop 3 and through part of the outgoing or feed line 7 for weak solution as well as in bridging or shunting the heat exchanger 9 and the throttling valve 10 through the bypass line 20. The ammonia contained in the refrigerant mixture is therefore driven out of the mixture and is collected at the coldest point of the loop, i.e., in the evaporator 5. Thereafter only substantially pure water remains in the generator 2, which is circulated by the pump 11 through the first part of the outgoing line 7, the bypass line 20, the absorber 6 and the return line 8; the absorber 6, together with the trickling or spray type heat exchanger 17, takes over the heat exchange between the primary loop through the generator 2 and the heating medium circulation loop 13.

When switching back to heat pump operation, the ammonia collected in the evaporator 5 flows into the absorber 6 where it serves to enrich the refrigerant mixture transported through the refrigerant loop 3. This restores the heat pump operation.

Figure 2:
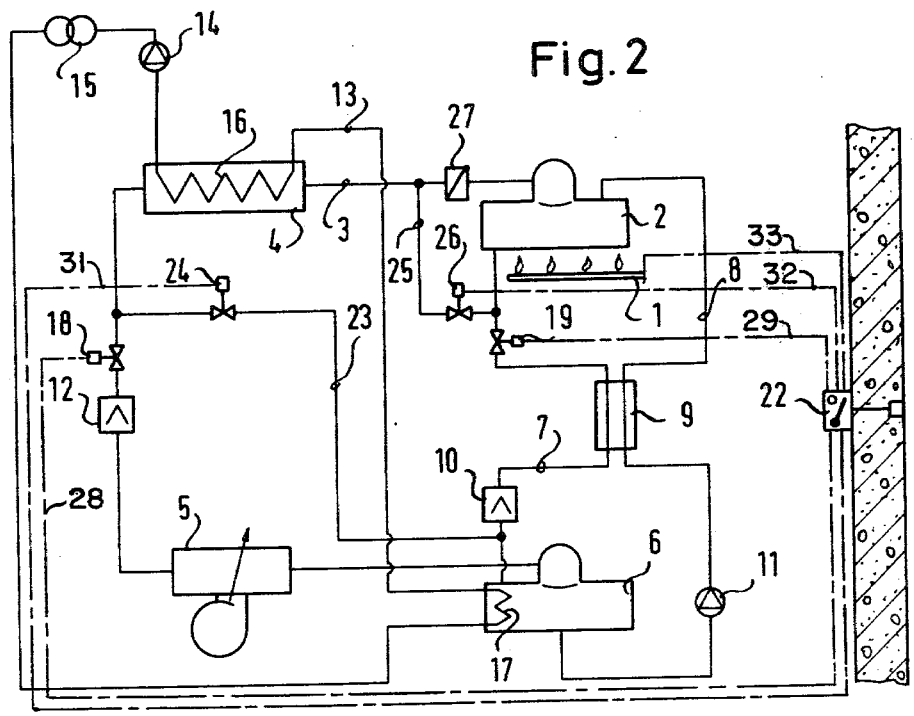
FIG. 2 is a view similar to FIG. 1 of a second embodiment according to the invention.

In the embodiment diagrammatically shown in FIG. 2, the magnetic valve 18 is disposed between the throttling valve 12 and the condenser 4. Instead of the bypass line 20 and the magnetic valve 21 shown in FIG. 1, a bypass line 23 is connected to the refrigerant loop 3, between the condenser 4 and the magnetic valve 18. The bypass line 23 has a magnetic valve 24 and opens into the feed line 7 between the absorber 6 and the throttling valve 10. A further bypass line 25 with an additional magnetic valve 26 is connected to the feed line 7 between the generator 2 and the magnetic valve 19 and opens into the refrigerant loop 3 between a check valve 27 and the condenser 4. In addition to the electrical lines 28, 29 and 33, the valves 24 and 26 are connected to the temperature switch 22 by electrical lines 31 and 32, respectively.

In the FIG. 2 embodiment there is seen a temperature switch 22 which senses the ambient temperature. The magnetic valves 18 and 19 are closed by the temperature switch 22 if the ambient temperature falls below a set value, and the magnetic valve 26 is opened. At the same time, the fuel supply to the burner 1 is also increased in this embodiment. After the refrigerant loop 3 is interrupted, the ammonia flows from the absorber 6 into the evaporator 5 as it did in the FIG. 1 embodiment. The water remaining in the refrigerant loop 3 is now circulated by the pump 11 through the condenser 4, the bypass line 23, the absorber 6 and the return line 8. The heat exchange to the heating medium loop 13 takes place through the heat exchanger 16 associated with the condenser 4 and through the trickling or spray type heat exchanger 17 which is associated with the absorber 6. Contrary to the embodiment shown in FIG. 1, after activation of the temperature switch 22 the heat exchanger 16 is operative in the embodiment of FIG. 2 in addition to the heat exchanger 17, during the heat exchanger operation.

The heating system according to the invention can, of course, also be switched to cooling operation in the conventional manner such as through the use of reversible multiple-way valves, so that the installation can be used, as required, for the heating or cooling of rooms.

There are claimed:

1. Bivalent heating system for switching between heat pump and heat exchanger operation, having an absorption heat pump with a coolant circulation loop having a generator being directly fired by a burner, a condenser, an evaporator and an absorber disposed therein, first heat exchanging means, an outgoing and a return line connected from the generator to the absorber through the first heat exchanging means, second heat exchanging means disposed in the coolant circulation loop, and a heating medium loop for space heating being coupled to the coolant circulation loop through the second heat exchanging means, comprising first valve means disposed in the coolant circulation loop for interrupting the flow therethrough, throttling means, a bypass line being connected upstream of said throttling means in coolant flow direction, having second valve means and shunting the evaporator, third valve means disposed in the outgoing line for interrupting flow therethrough, and temperature switch means for sensing ambient temperature and operating said first, second and third valve means for switching coolant flow from heat pump operation through the coolant circulation loop to heat exchange operation through part of the outgoing line, said bypass line, the absorber, the return line and the generator when a predetermined low ambient temperature is reached and for increasing fuel supply to the burner when switching to heat exchange operation.

2. Bivalent heating system for switching between heat pump and heat exchanger operation, having a directly fired absorption cycle heat pump with an absorber and a burnerheated generator disposed in a refrigerant circulation loop, the refrigerant loop being coupled through heat exchanging means disposed upstream of the generator in refrigerant flow direction to a heating medium loop for space heating, comprising control means activatable when a predetermined low ambient temperature is reached for increasing fuel supply to the burner of the heat pump and for switching coolant circulation from heat pump operation to heat exchanger operation, first valve means for interrupting circulation in the refrigerant loop, an evaporator disposed in the refrigerant loop, throttling means, a valve-controlled by-pass line shunting said evaporator and being connected upstream of said throttling means, second valve means for interrupting flow between the generator and the absorber, a condenser disposed in the refrigerant loop, a check valve disposed in the refrigerant loop between the generator and said condenser, a further bypass line connected from the generator to a location in the refrigerant loop between said check valve and said condenser bypassing said throttling means, and third valve means for controlling flow through said further bypass line, the coolant circulating through the refrigerant circulation loop in heat pump operation and through said condenser, the first-mentioned bypass line, said absorber, the generator and the further bypass line in heat exchanger operation.

* * * * *